United States Patent [19]

Frisch

[11] Patent Number: 4,834,141

[45] Date of Patent: May 30, 1989

[54] TWO POSITION SEAT VALVE

[75] Inventor: Herbert Frisch, Vienna, Austria

[73] Assignee: Hoerbigee Ventilwerke Aktiengesellschaft, Vienna, Austria

[21] Appl. No.: 123,203

[22] Filed: Nov. 20, 1987

[30] Foreign Application Priority Data

Nov. 27, 1986 [AT] Austria .................................. 3169/86

[51] Int. Cl.[4] .................... F15B 13/042; F16K 11/044
[52] U.S. Cl. ........................... 137/625.66; 137/625.27; 137/625.5; 251/333
[58] Field of Search ........... 137/625.27, 625.5, 625.66; 251/333

[56] References Cited

U.S. PATENT DOCUMENTS

| 2,639,728 | 5/1953 | Briechle | 137/625.27 |
|---|---|---|---|
| 2,645,451 | 7/1953 | Gladden | 137/625.27 X |
| 2,812,776 | 11/1957 | Lofftus et al. | 137/625.5 X |
| 2,934,090 | 4/1960 | Kenann et al. | 137/625.27 X |
| 3,165,293 | 1/1965 | McClure | 251/361 X |
| 3,707,162 | 12/1972 | Backmann | 137/625.66 X |
| 4,067,357 | 1/1978 | Ruchser | 137/625.66 X |
| 4,501,289 | 2/1985 | Pauliukonis | 137/625.5 X |
| 4,574,844 | 3/1986 | Neff et al. | 137/625.27 X |

FOREIGN PATENT DOCUMENTS

| 1189346 | 3/1965 | Fed. Rep. of Germany | 137/625.27 |
|---|---|---|---|
| 8986 | of 1884 | United Kingdom | 251/333 |
| 16020 | of 1891 | United Kingdom | 251/333 |

Primary Examiner—Gerald A. Michalsky
Attorney, Agent, or Firm—Watson, Cole, Grindle & Watson

[57] ABSTRACT

In order to be able to manage with minimum switching force, one of the respective sealing regions on the switching member or valve body of a two-position seat valve is made in the form of a circular sharp edge of small cross-sectional edge radius, thus requiring only a very small force for keeping the valve tight. In particular, in combination with a pressure equalizing construction, this enables very low control energy to undergo maximum amplification.

8 Claims, 2 Drawing Sheets

TWO POSITION SEAT VALVE

BACKGROUND OF THE INVENTION

The invention relates to a two-position seat valve with a valve body comprising the connections for the medium to be controlled and a switching member movable for switching purposes in an axial direction in the valve body and comprising at least one sealing region which lies in a plane substantially perpendicular to the direction of movement of the switching member, and which when in its closed position lies against a substantially facing fixed sealing region on the valve body, the connections for the medium to be controlled opening into the body interior on one and the other side of the fixed sealing region.

In order to amplify to a maximum extent the low control energy available in particular in pneumatic systems, directional valves are used having a large nominal diameter and a small control medium requirement for their operator elements. In the case of valves with diaphragm operators this means a somewhat small diaphragm diameter, a small life, low control pressure and a small clearance.

With seat valves it is certainly possible to switch large nominal diameters using a small operating element lift, but this means that all the noted requirements cannot be fulfilled. In the case of diaphragm valve operation, in order to be able to manage with low control pressure with a small diaphragm area, the seat valve must be able to be operated using minimun switching force. In the present state of the art the most suitable type for fulfilling all the aforesaid requirements is a pressure equalizing valve, the basic construction of which is well known - see for example EP 0 110 139 B1. The advantage of the pressure equalizing valve is that the air pressure has no influence on the required switching force. Drawbacks are the relatively large forces required for sealing against the seats and overcoming the switching friction, and the lifts deriving from the different tolerances, for compensating which the clearances have to be increased.

The object of the invention is to so improve a two-position seat valve of the aforesaid type as to obviate the noted drawbacks of known arrangements and in particular to provide by simple and cost-effective means a valve which requires only low control energy while at the same time operating satisfactorily.

SUMMARY OF THE INVENTION

This is attained according to the present invention in that one of the respective sealing regions on the switching member or valve body is made in the form of a circular sharp edge of small cross-sectional edge radius. As a a result of the thus one-sided sharp-edged seal between the switching member and valve body, very small sealing forces can be used while nevertheless ensuring satisfactory tightness. By this means the switching force can also be kept very low, thus requiring for example in the case of diaphragm operation only a small quantity of control air and a low control pressure.

According to a further preferred embodiment of the invention, the sharp-edged sealing region is provided on the switching member and the fixed sealing region is provided on a seal ring of elastic material clamped in the valve body. In order for the seat valve to operate securely in the aforesaid manner with low sealing force, the sharp-edged sealing region must be neither undulated nor jagged or the like. As the switching member is normally made of hard material such as steel by machine-turning, thus embodiment allows a good seal to be easily obtained between the two respective sealing regions. With the noted construction by the machine-turning of stel or the like, it is also possible to maintain small tolerances in the distance between the sharp-edged sealing regions on the switching member, and which correspond substantially to the total lift tolerances, thus attaining high seat valve quality.

According to a further embodiment of the invention, the diameter of the sharp-edged sealing region is substantially equal to the diameter of the switching member guide region tight within the body interior, by which pressure-equalized operation of the switching member is obtained in a simple and advantageous manner.

According to a further advantageous embodiment of the invention, in which the valve is in the form of a 3/2-way valve, two sharp-edged sealing regions on the switching member, when viewed in its direction of movement, lie within two respective seal rings, between the two seal rings there being clamped within the valve body a spacer ring having at least one lateral recess which opens into one of the medium connections. The seal rings on the air feed and discharge sides therefore have a double function: for a respective position of the switching member they seal the air feed or air discharge against the central medium connection while at the same time sealing the spacer ring in the valve body. The distance between the two seal ring clamping surfaces on the spacer ring, and of which the tolerances strongly influence the lift tolerances of the switching member, can be easily controlled during manufacture. Moreover, by appropriately shaping the clamping surfaces of the spacer ring, it can be easily ensured that the seal rings themselves remain flat when in the clamped state, this having a very positive effect in that the sealing force does not have to be raised to give reliable sealing.

According to a further embodiment of the invention, support ledges can be provided on the valve body and/or spacer ring in order to limit the compression of the seal ring, and lie against the other respective structural part when the valve is in its assembled state. These support ledges not only limit the compressibility of the seal rings, so that their shape remains protected in spite of their elasticity, but they also transmit by way of non-elastic parts the force required to hold the body together.

According to a further preferred embodiment of the invention, circular sealing ridges can be provided on the seal ring clamping surfaces on the valve body and/or spacer ring, in order to improve sealing without the danger of crushing the seal rings. According to a further embodiment of the invention, in order to prevent the seal ring on the air feed side turning inwards when the air feed port is open, the clamping surface for the air feed side seal ring extends, on the same side as the sharp-edged sealing region, as a support shoulder which almost reaches the sharp-edged sealing region itself.

According to a further preferred embodiment of the invention, in order to obtain symmetrical snap-action switching of the seat valve in a further pressure region, the sharp-edged sealing region on the air feed side has a somewhat smaller diameter and the sharp-edged sealing region on the air discharge side has a somewhat larger diameter than the sealed guide region for the switching member in the body interior, the switching member when in its unoperated state being urged by an axially acting spring into its end position in which the feed air is shut off, in this position the spring force amounting to about one half the force applicable by the operator system.

The invention will be described in detail hereinafter with reference to the embodiments shown on the accompanying drawings in diagrammatic partial form.

DETAILED DESCRIPTION OF THE PREFERRED EMBODIMENTS

Figure 1:
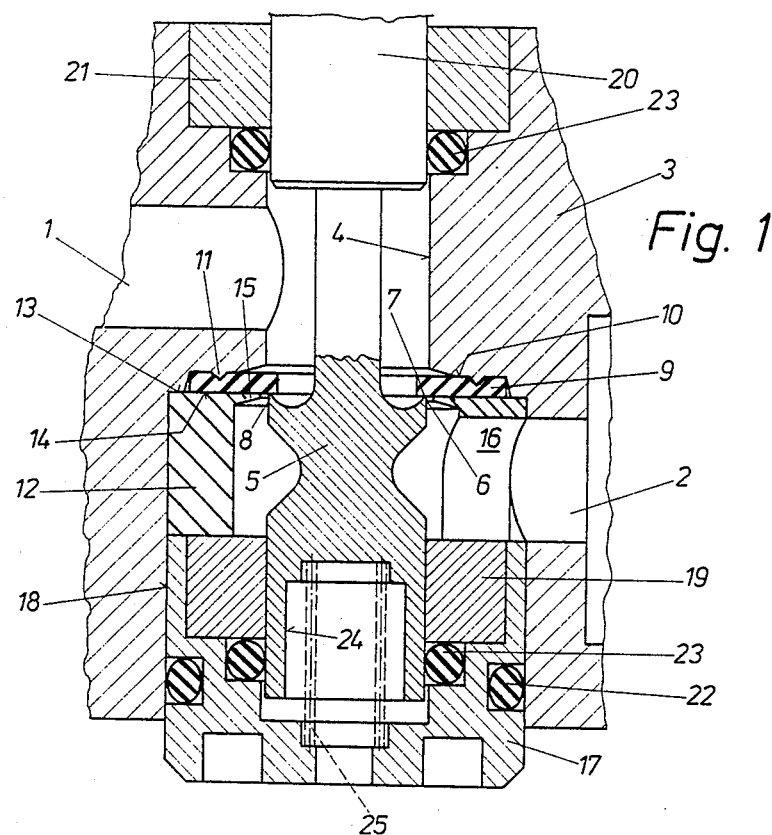
FIG. 1 is a longitudinal section through part of a 2/2-way valve according to the invention.

The two-position seat valve of FIG. 1 comprises a housing which includes a valve body 3 and a cover piece 17, the valve body 3 providing connections 1, 2 for the medium to be controlled, and a switching member 5 which is movable for change-over purposes in an axial direction in an inner compartment 4 of the body. The switching member 5 in this case comprises a sealing region 6 which lies in a plane perpendicular to its direction of movement and which in the illustrated closed position lies against a substantially facing fixed sealing region 7 on the valve body 3. The connections 1, 2 for the medium to be controlled and which open into the body inner compartment 4 on one and the other side of the fixed seal region 7 do not communicate when the valve is in the illustrated closed position.

The sealing region 6 on the switching member 5 is in the form of a circular sharp edge 8 with a small cross-sectional edge radius, whereas the sealing region 7 on the valve body 3 is located on an elastic material seal ring 9 clamped in the valve body 3. As a result of this form of sealing, very small sealing forces are sufficient as, even for small forces acting between it and the seal ring 9, the sharp-edged sealing region 6 is urged sufficiently against the elastic material of the seal ring 9 and forms a reliable seal.

In the embodiment illustrated in FIG. 1, the seal ring 9 is inserted from underneath, a circular sealing ridge 11 being provided on the clamping surface 10 of the valve body 3 to improve the seal in this position without increased clamping force having to be used, which could involve the danger of deforming the actual sealing region 7. On the opposite side to the clamping surface 10 the seal ring 9 is retained by a spacer ring 12 which presses against a support ledge 13 on the valve body 3 so as to limit the compressibility of the elastic gasket 9 to the amount defined by the height of the support ledge 13. The clamping surface 14 for the seal ring 9 extends thereat in the form of a support shoulder 15 which nearly reaches the sharp-edged sealing region 6. As air is normally fed to the medium connection 1 in the illustrated embodiment, the arrangement ensures that the seal ring 9 cannot turn inwards even when the valve is open.

The spacer ring 12, which comprises a lateral recess 16 on the same side as the medium connection 2, engages at its lower end distant from the seal ring 9 the cover piece 17 which is fixed, by non-illustrated means, in the holding bore 18 of the valve body 3 and applies the necessary clamping force for the seal ring 9. A guide bush 19 inserted into the cover part 17 allows axial guiding of the lower region of the switching member 5 which in its, with reference to the figure, upper part comprises a second guide region 20 which can axially slide in a furthre guide bush 21. The cover part 17 is sealed against the holding bore 18 by an O-ring 22. For sealing the switching member 5, O-rings 23 are provided on both its guide regions, the diameter of the two sealed guide regions of the switching member 5 being in the illustrated embodiment equal to the diameter of the sharp-edged sealing region 6, so that the pressure at the medium connections 1 and 2 can have no influence on the sealing force or switching force of the valve. In the, with reference to the figure, lower region of the switching member 5, this latter comprises an end recess 24 containing a spring 25 supported at one end against the cover part 17 and at its other end against switching member 5, in order to urge the switching member 5 against the seal ring 9 when in its rest state. On operating the switching member 5 in order to open the valve, which can be done by normal means, not shown, such as a diaphragm acted upon by a control pressure, a magnet or the like, the switching member 5 moves downwards against the force of the spring 25, so that the sealing region 6 separates from the sealing region 7 and allows flow.

With the illustrated embodiment, very small sealing forces and consequently very small switching forces are sufficient, these being advantages particularly in relation to the amplification of low pneumatic control energy.

Figure 2:
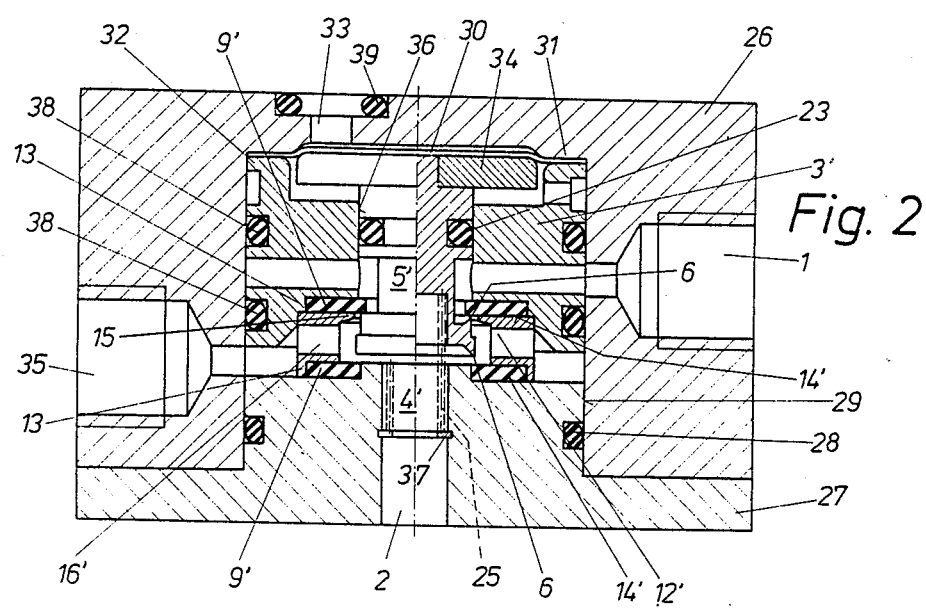
FIG. 2 shows a corresponding section through a 3/2-way valve according to the invention.

In the embodiment shown in FIG. 2, an inner valve body 3' is inserted in an outer valve body 26 and by means of a cover 27, which is sealed in the insertion bore 29 by a seal ring 28, is fixed in such a manner as to clamp a diaphragm 30 between a circular ledge 31 on the end of the insertion bore 29 and an annular front wall 32 on the valve body 3'. The diaphragm 30 can be loaded on its, with reference to the figure, upper side with control pressure through a control inlet 33 to switch the valve, and lies on its lower side against a press plate on the switching member 5'. In this case the switching member 5' comprises two sharp-edged sealing regions 6 on opposite sides of an annular projection and which lie in planes perpendicular to its direction of movement and which when viewed in the direction of movement are disposed within two respective seal rings 9' of the valve body 3'. A spacer ring 12' is clamped in the valve body 3' between the two seal rings 9', its two clamping surfaces 14' being at a distance apart equal to the distance between the sealing regions 6 plus the lift of the switching member 5'. The body interior 4' can communicate with a lateral medium connection 35 by way of lateral recesses 16'. The two other medium connections of this 3/2-way valve are again indicated by 1 and 2. The two sharp-edged sealing region 6 on the switching member 5' are in this case formed such that, with reference to the figure, lower sealing region associated with the air discharge seat has a somewhat larger diameter and the, with reference to the figure, upper sealing region associated with the air inlet seat has a somewhat smaller diameter than the guide region 36, which is again sealed in the body interior by an O-ring. In addition, the strength of the spring 25 which urges the switching member 5' from below into its upper switching position, and which is supported on a ring 37 in the bore of the medium connection 2, is so chosen as to amount to about one half of the force which can be applied by way of the diaphragm 30 or control inlet 33. By the combination of these means, symmetrical snap-action switching of the valve in a further pressure region is obtained.

The spacer ring 12' againlies against a support ledge 13 on the valve body 3', by which the compressibility of the upper of the seal rings 9' is again limited. On its lower side, the spacer ring 12' also comprises a support ledge 13 to limit the compressibility of the lower seal ring 9' against the cover 27, by which means an overall rigid force transmission is obtained between the cover 27 and valve body 3' by way of the spacer ring 12'. To prevent the upper seal ring 9' turning inwards when its associated seat is open and the pressure medium is flowing through the medium connection 1, the spacer ring 12' is again provided with a support shoulder 15 which extends nearly as far as the associated sharp-edged sealing region 6.

For purposes of completion it should be noted that seal rings 38 are provided for sealing the inner valve body 3' against the insertion bore 29, and a seal ring 39 is provided at the control inlet.

Figure 3:
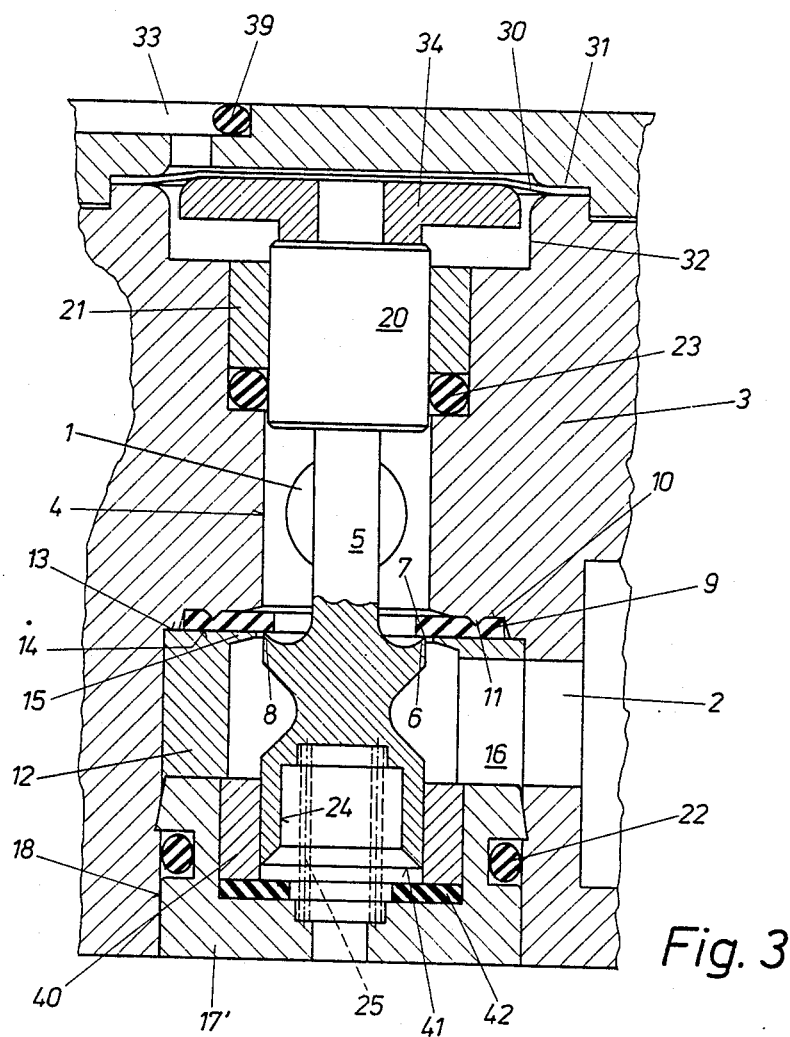
FIG. 3 shows an embodiment similar to FIG. 1 of a 2/2-valve according to the invention.

The embodiment of FIG. 3 corresponds in all important details to the embodiment of FIG. 1, but with the addition that the valve is shown operated by a pressure diaphragm corresponding to the embodiment of FIG. 2. Thus in FIG. 3 identical or similarly operating parts are indicated by the same reference numerals as in FIGS. 1 and 2, and to avoid repetition only the differences with respect to the said examples are described.

The embodiment of FIG. 3 differs substantially only in that the switching member 5 is guided and sealed at its lower end by a guide bush 40 which by virtue of its material and appropriate close fitting about the switching member 5 also takes over the sealing function. When the valve seat is open, the switching member 5 sits by means of its sharp-edged lower end surface 41 on an elastic ring 42, which then does most of the sealing. The cover part 17' is again inserted into a holding bore 18 in the valve body 3 and is sealed by means of an O-ring 22.

In all embodiments, the switching element can preferably be of hard and, because of the sharp-edged sealing regions, accurately machinable material such as stainless steel or the like, whereas the remaining parts of the valve do not have to satisfy any special requirements and these can for example be of aluminium or materials suitable for die-casting or injection moulding.

What is claimed is:

1. A two-position seat valve which includes
   a valve housing which defines an interior chamber and which provides first, second and third passageways for a fluid medium that communicate with said interior chamber,
   first and second sealing rings positioned in said interior chamber such that said first sealing ring is positioned between where said first and second passageways communicate with said interior chamber and said second sealing ring is positioned between where said second and third passageways communicate with said interior chamber,
   a spacer ring positioned in said interior chamber and between said first and second sealing rings, said spacer ring defining a lateral hole therein to allow fluid medium flow therethrough to said second passageway,
   an axially movable switching member which is positioned in said interior chamber and within said first and second sealing rings and within said spacer ring, said switching member including two oppositely facing annular sharp-edged sealing ridges which are positioned between said first and second sealing rings and which are located in respective planes which are perpendicular to the direction of axial movement of said switching member, said first annular sealing ridge being engageable with said first sealing ring to prevent fluid medium flow between said first passageway and second and third passageways and said second annular sealing ridge being engageable with said second sealing ring to prevent fluid medium flow between said first and second passageways and said third passageway based on the axial positioning of said switching member within said interior chamber.

2. A two-position seat valve as defined in claim 1, wherein said valve housing comprises an outer valve body which has an open end and a cover element which covers said open end, said first and second passageways extending through said outer valve body and said third passageway extending through said cover element.

3. A two-position seat valve as defined in claim 2, including a spring which extends between said cover element and said switching member to bias said switching member within said interior chamber such that said first annular sealing ridge thereof engages with said first sealing ring.

4. A two-position seat valve as defined in claim 3, wherein said outer valve body includes a control fluid passageway therein opposite to said cover element and wherein a diaphragm is located in said interior chamber between said control fluid passageway and said switching member.

5. A two-position seat valve as defined in claim 2, including an inner valve body located within said outer valve body, said inner valve body supporting said first sealing ring and said cover element supporting said second sealing ring, said inner valve body defining an inner guide surface for said switching member which has a predetermined diameter.

6. A two-position seat valve as defined in claim 5, wherein said first annular sealing ridge defines a diameter which is smaller than said predetermined diameter and said second annular sealing ridge defines a diameter which is larger than said predetermined diameter.

7. A two-position seat valve as defined in claim 5, wherein said switching member includes an annular projection and wherein said first and second annular sealing ridges are located on opposite sides of said annular projection.

8. A two-position seat valve as defined in claim 1, wherein said spacer ring includes a shoulder at its end in contact with said first sealing ring, said shoulder extending towards an annular region on said first sealing ring where said first annular sealing ridge contacts said first sealing ring.

* * * * *